United States Patent [19]

Donzis

[11] Patent Number: 5,235,715
[45] Date of Patent: Aug. 17, 1993

[54] IMPACT ASBORBING COMPOSITES AND THEIR PRODUCTION

[76] Inventor: Byron A. Donzis, 40 E. Stillforest, Houston, Tex. 77024

[21] Appl. No.: 464,700

[22] Filed: Jan. 16, 1990

Related U.S. Application Data

[63] Continuation of Ser. No. 99,368, Sep. 21, 1987, abandoned.

[51] Int. Cl.⁵ .................. A43B 19/00; A41D 13/00; B29D 27/04
[52] U.S. Cl. .................... 12/142 R; 36/71; 36/89; 36/81; 264/46.6; 2/2
[58] Field of Search .............. 36/37, 89, 92, 81, 71, 36/82, 138, 44; 2/2, 22; 264/46.6, 45.1, 46.8; 5/434, 481, 443, 473; 12/142 R

[56] References Cited

U.S. PATENT DOCUMENTS

| | | | |
|---|---|---|---|
| Re. 31,898 | 5/1985 | Suter | 5/481 |
| 2,232,646 | 2/1941 | Stone | |
| 3,123,403 | 3/1964 | Hood | 264/46.6 |
| 3,124,887 | 3/1964 | Vassar | 36/81 |
| 3,379,800 | 4/1968 | Wert | 264/46.6 |
| 3,500,472 | 3/1970 | Castellani | 2/2 |
| 3,507,727 | 4/1970 | Marshack | 2/2 |
| 4,006,503 | 2/1977 | Wood | |
| 4,039,363 | 8/1977 | Robertson | |
| 4,168,585 | 9/1979 | Geichner | 36/37 |
| 4,261,776 | 4/1981 | Lea et al. | |
| 4,268,571 | 5/1981 | McCarthy | 264/46.6 |
| 4,336,661 | 6/1982 | Medrano | 36/44 |
| 4,347,205 | 8/1982 | Stewart | |
| 4,364,188 | 12/1982 | Turner et al. | 376/30 R |
| 4,486,901 | 12/1984 | Donzis | 2/2 |
| 4,501,541 | 2/1985 | Bethell et al. | 264/46.6 |
| 4,513,449 | 4/1985 | Donzis | 2/22 |
| 4,546,899 | 10/1985 | Williams | 264/46.8 |
| 4,670,995 | 6/1987 | Huang | 36/44 |
| 4,700,403 | 10/1987 | Vacanti | 36/71 |

FOREIGN PATENT DOCUMENTS

| | | |
|---|---|---|
| 2217759 | 10/1973 | Fed. Rep. of Germany . |
| 24020 | 10/1907 | United Kingdom ............ 36/37 |
| 861983 | 3/1961 | United Kingdom . |

*Primary Examiner*—Steven N. Meyers
*Attorney, Agent, or Firm*—Pravel, Hewitt, Kimball & Krieger

[57] ABSTRACT

An improved composite for absorbing and dispersing impacting forces is disclosed. The composite includes a flexible plastic enclosure defining an internal cavity. The flexible enclosure is generally impermeable to air and capable of having its internal pressure changed. The composite further includes a foam core filling the cavity and retained within the cavity and adhered on substantially all of its external surface to the internal surface of the cavity. The cavity can be pressurized for higher impact absorbance. Methods for fabricating the composites are disclosed, as well.

3 Claims, 4 Drawing Sheets

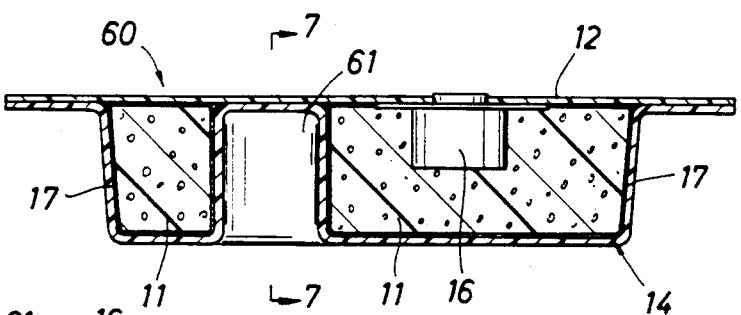
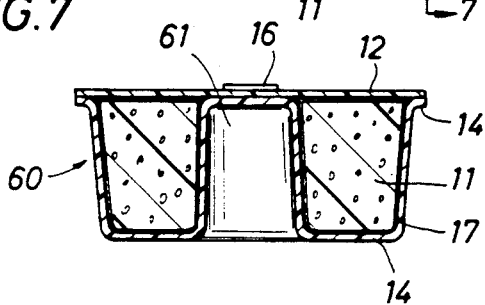
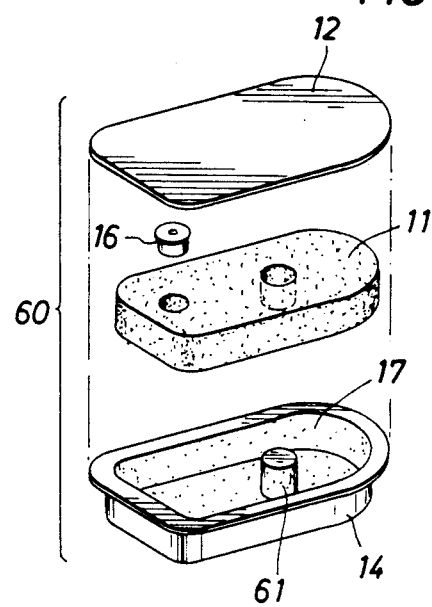
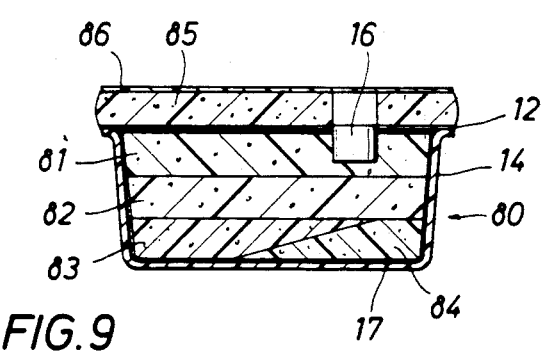
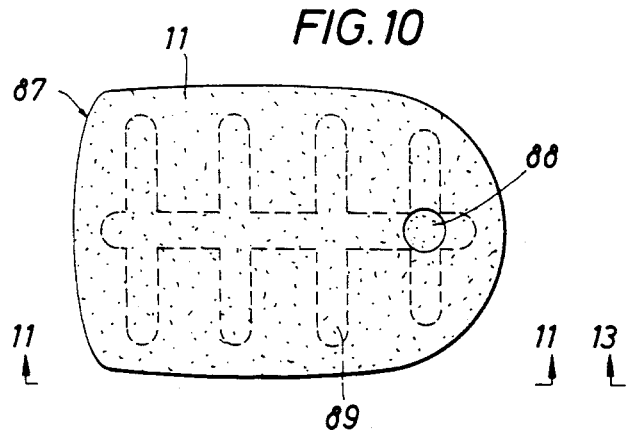
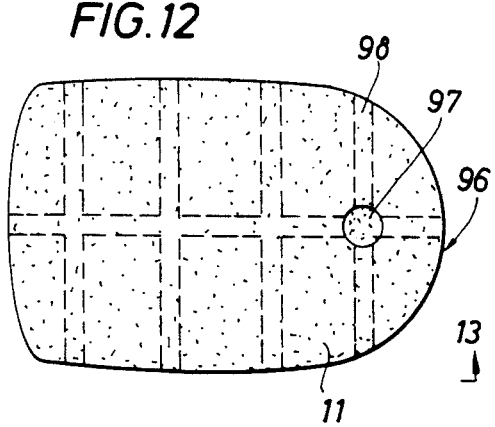
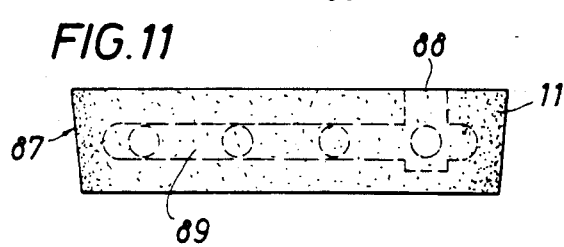
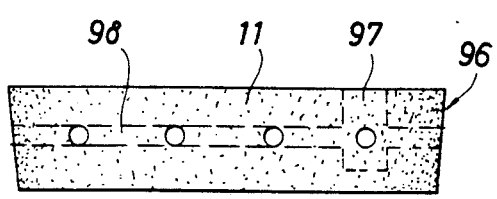

IMPACT ASBORBING COMPOSITES AND THEIR PRODUCTION

This is a continuation of copending application Ser. No. 07/099,368 filed on Sep. 21, 1987, now abandoned.

BACKGROUND OF THE INVENTION

1. Field of the Invention

This invention relates to improved impact absorbing compressible composites. These composites can be shaped into smooth compound curves and find application wherever high efficiency impact absorption is called for such as in athletic wear, in seating systems, in vehicle interior padding materials and the like.

2. Background Information

There is a well-recognized need for high performance materials for spreading or absorbing impacts. In recent years, athletes, athletic equipment manufacturers and sports medicine professionals have recognized the need for improved impact absorbing materials in athletic equipment. These materials find application as heel pads and foot sole pads in shoes to absorb the shock of foot strike and as cushioning points under football or hockey pads such as shoulder pads, thigh pads, hip pads and the like to name but a few typical applications. Similar needs may be found in seating systems and in vehicle interiors, to name but a few representative fields in which impact absorption is a major interest.

One common approach to impact absorption in the past has involved using felts or blocks of a soft padding material. Padding materials known heretofore include cotton padding, horsehair padding, foam rubber, foamed plastics, sponge rubber and the like. In these designs, the inherent resilience of the padding material is employed to absorb and disperse the applied impact. These designs have the disadvantage that they often "bottom out" or fully compress on severe impacts of the type regularly encountered during use such as in athletic equipment or in vehicle interiors and thus provide minimal protection. When made thicker to avoid this problem, they become cumbersome and can interfere with the design of the article being padded, and in the case of athletic equipment can interfere with the wearer's freedom and performance.

Impact absorbers have also been proposed which employ fluid-filled bladders such as cushioning air sacks. These devices rely upon the compressibility of the enclosed fluid to provide the desired shock absorbing. In some embodiments of these devices, the fluid is fully enclosed and can not escape. In others, the fluid is gradually and controllably forced out of the bladder during the impact with the rate of release being selected to prevent exhaustion of the fluid during the impact event. While effective as shock absorbers, these devices can have the failing of ballooning or otherwise expanding in one region when another region is being compressed. This can lead to discomfort or at minimum give an unnatural or unstable feel to the user. In the case of footwear, this problem can lead to an unstable foot plant with increased opportunity for injury. Another issue with this type of pad has related to problems in forming shapes based on compound curve and to retaining structural integrity with the above-described ballooning.

Representative patents in the field of shock absorbing or impact absorbing devices include U.S. Pat. No. 4,513,449, SHOCK ABSORBING ATHLETIC EQUIPMENT; U.S. Pat. No. 4,370,754, VARIABLE PRESSURE PAD; U.S. Pat. No. 4,453,271, PROTECTIVE GARMENT; U.S. Pat. No. 4,217,705, SELF-CONTAINED FLUID PRESSURE FOOT SUPPORT DEVICE, all issued to Donzis, U.S. Pat. No. 4,446,634 for FOOTWEAR HAVING IMPROVED SHOCK ABSORPTION; U.S. Pat. No. 4,397,104 for INFLATABLE SOLE-SHOE; U.S. Pat. No. 2,863,230 for CUSHIONED SOLE AND HEEL FOR SHOES; U.S. Pat. No. 4,229,889 for PRESSURIZED POROUS MATERIAL CUSHION SHOE BASE; U.S. Pat. No. 4,637,716 for METHOD FOR MAKING ELASTOMERIC SHOE SOLES; U.S. Pat. No. 4,635,384 for FOOTWEAR SOLE; U.S. Pat. No. 4,610,099 for SHOCK-ABSORBING SHOE CONSTRUCTION; and U.S. Pat. No. 4,571,853 for SHOE INSERT.

It is an object of the present invention to provide an improved impact absorbing composite. It is desired that this composite provide superior shock absorbing performance and also be capable of being formed into complex compound curve shapes, be durable and hygienic.

STATEMENT OF THE INVENTION

An improved impact absorbing composite has now been found. This composite is capable of dispersing and absorbing impacting forces with high efficiency. The composite is characterized by a structure including a flexible plastic wall (enclosure) defining an internal cavity. This flexible enclosure is made of a material that is generally impermeable to air and is capable of having its internal pressure changed. The internal cavity of the enclosure is filled with a foam core. This core is held in place by the cavity walls. Importantly, the core is intimately adhered (glued, bonded or the like) on substantially all of its external surfaces to the internal surface of the cavity. In preferred embodiments, the wall and the core are prestressed by one another. That is, the core presses out against the wall and the wall pushes in against the core. The intimate adherent contact between the foam core and the outer wall gives rise to an unexpected degree of product integrity and unexpectedly superior impact absorbing capabilities.

In preferred embodiments, the composite has a valve or fitting communicating with the cavity so that the pressure within the cavity can be altered. This permits the composite to be adjusted to accommodate varying impacts. The invention can thus include in combination such a composite together with a device for pressurizing its cavity.

Also in preferred embodiments, the foam core is an open-celled foam or a reticulated foam so that the pressure within the core is uniform. Urethane polymers have been found to be excellent for forming the cavity and the foam and are preferred materials of construction.

In other aspects, the composites of the invention can employ cores having a plurality of different foams arranged parallel or perpendicular to the impact direction. This permits differing densities and impact resistances to be present at different positions on the composite. The impact absorbers of this invention can be used in conjunction with other materials or layers including without limitation, cosmetic or hygienic overlayers, other shock-absorbing layers or the like.

In yet another aspect, this invention provides a variety of methods for fabricating these composites. All of these methods are characterized by creating an adherent bond between the foam core and the outer layer and by pressurizing the core to a value effective to provide efficient impact absorption.

One such method involves shaping the wall surface to create a cavity, sizing and shaping the foam core so as to fully fill the cavity and preferably prestress the wall and core, adhering and enclosing the core within the cavity and adjusting the pressure within the cavity to a value effective to provide efficient impact absorption.

Another fabrication method involves shaping the wall surface to create a cavity, sizing and shaping the core so as to partially fill the cavity, placing the core within the cavity, forming an elastomeric foam and preferably an open-celled or reticulated foam in situ within the cavity so as to fill the space between the preshaped foam and the cavity wall and to adhere the cavity wall to the core and preferably prestress the wall and core, and adjusting the pressure within the cavity to a value effective to provide efficient impact absorption.

Yet another fabrication method involves shaping the wall surface to create a cavity, forming a cavity-wall-adherent open-celled or reticulated foam core in situ within the cavity so as to fill the cavity and preferably prestress the wall and core, and adjusting the pressure within the cavity to a value effective to provide efficient impact absorption.

A further fabrication method involves sizing and shaping the foam core, forming the outer wall in situ around and adherent to the foam core such as by shrinking a film a core-adherent material around the core or by applying a layer of uncured wall material, such as a solution of wall-forming polymer, around and adherent to the core and then curing the uncured wall material, thereby creating a cavity enclosing and preferably prestressing the core, and adjusting the pressure within the cavity to a value effective to provide efficient impact absorption.

The present shock absorbing composites can be employed in a wide range of applications. One excellent application is as heel pads and/or sole pads for shoes, especially sport shoes, where they serve to absorb foot strike impact with high efficiency.

The composites of this invention are characterized by being easily formed in compound curve forms, by being very light weight and by being hygienic. They are further characterized by being adjustable in pressure, and thus in impact cushioning capacity. This permits them to serve in a wide range of applications with widely variable impacts.

DETAILED DESCRIPTION OF THE INVENTION

Brief Description of the Drawings

The present invention will be described herein with reference being made to the accompanying drawings. Where practical in the drawings, a common reference numeral is used for the same part when it appears in more than one Figure. In the drawing:

FIG. 6 is a cut away cross-sectional view of another alternative embodiment of the impact absorber of this invention in which the wall material defining the cavity is further shaped to provide a supportive column;

FIG. 7 is another cross sectional view of the absorber shown in FIG. 6 taken along line 7—7';

FIG. 8 is an exploded perspective view of the components of the absorber of FIGS. 6 and 7;

FIG. 9 is a perspective view of an alternative embodiment of the impact absorber of this invention. This embodiment employs a core which has a plurality of differing compression strength foams arranged perpendicular to the impact force;

FIG. 10 is a phantom top view of a core configuration for use with closed cell foam materials;

FIG. 11 is a cross sectional view of the core shown in FIG. 10 taken along line 11—11';

FIG. 12 is a phantom top view of another core configuration for use with closed cell foam materials;

FIG. 13 is a cross sectional view of the core shown in FIG. 12 taken along line 13—13';

DESCRIPTION OF THE PREFERRED EMBODIMENTS

Figure 1:
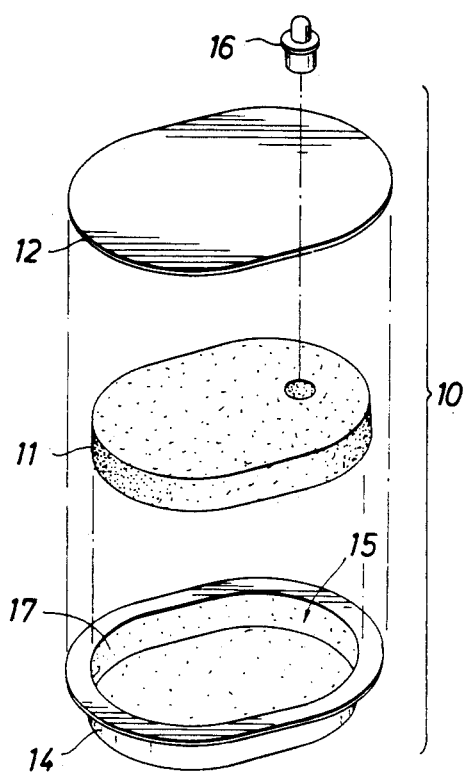
FIG. 1 is an exploded perspective view of the components of an impact absorber of this invention.
Figure 2:
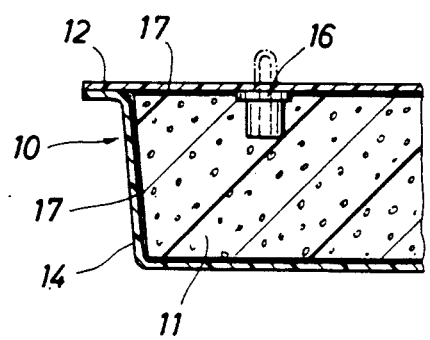
FIG. 2 is an cut away cross-sectional view of a shock absorber of this invention.

Referring to FIGS. 1 and 2 in more detail, these figures illustrate an impact absorber 10. Impact absorber 10 includes a foam core 11 and top and bottom wall sections 12 and 14 which when joined define a cavity 15. A layer of adhesive 16 is present between essentially all of the inner surface of cavity 15 and the outer surface of foam core 11. This layer is shown on core 11 but could as well be on the inside surface of the wall or on both the core and the wall as desired. When wall sections 12 and 14 are joined, the cavity which they define is pressure tight. It is possible to equip the impact absorber with a valve or fitting such as valve 16. Valve 16 is a "Halkey-Roberts" type urethane valve which is shown in FIG. 1 in its pre-assembly form. After incorporation, the top end of valve 16 is cut off flush with the surface of the shock absorber as shown in FIG. 2. Any equivalent form of valve or pressure control aperture can be used, if desired. This valve allows the pressure in the interior (cavity 15) of the impact absorber to be adjusted, as desired, by adding or removing fluid from the cavity.

The outer wall of the impact absorber is formed of flexible plastic. The materials used to form the wall can be selected from the film-forming flexible plastics. Virtually any plastic can be used so long as it is resistant to bacterial attack, flexible and shapable into the forms and configurations desired. Useful film-forming plastics include poly(urethane)s both of the poly(ether) and the poly(ester) form, poly(ester)s such as poly(ethylene terphthalate), flexible poly(vinyl)s, elastomeric poly(olefin)s such as poly(isoprene), poly(isobutylene), and neoprene, low density poly(ethylene)s and the like.

In the embodiment shown in FIGS. 1 and 2, the outer wall is preshaped into the desired configuration and then the foam core is adhered to it. In another embodiment, the outer wall can be formed around the foam core. One way to accomplish this is to use a liquid polymer precure solution or suspension which is applied to the outer surface of the core and then cured. Another way to accomplish this is to use plastic sheet stock and laminate it to the core or shrink it around the core. In any of these alternative modes of construction, it is essential that there be a strong adherent bond between the wall and essentially the entire outer surface of the core.

Of the plastics useful in forming the films, preference is given to the flexible poly(urethane)s because of their ready availability. These materials are available from J. P. Stevens Company and Deerfield Urethane, Inc., to name but two regular suppliers. Representative useful plastic films include the Deerfield "Dureflex" poly(urethane) films. These materials can be preformed, as in FIGS. 1 and 2 or they can be used as stock goods. When a liquid is used to apply the outer wall, it is typically a solution of a prepolymer or resole resin. Vinyl films can be used in this application. A typical vinyl film is the vinyl adhesive sealant produced by W. R. Grace and marketed by Eclectic Products as Eclectic 6000 adhesive sealant. These materials are solvented in halocarbons such as perchloroethylene and the like. A preferred liquid coating is based on the polyurethanes. Again, the nonrigid urethane polymers are preferred. The solutions known in the art for forming flexible urethane films are very suitable for this application. Typical urethane polymer solutions include the reaction product of a diisocyanate such as toluene diisocyanate or hexamethylene diisocyanate with a polyol such as a polyether polyol. These reaction products are commonly produced in a mixed solvent system such as a polar solvent (for example, Butyl Cellosolve, Cellosolve Acetate, butyl Carbitol, or diacetone alcohol or the like) in combination with an aromatic solvent such as toluene, benzene, or hydrocarbon distillate fractions heavy in aromatics and having a boiling range in the range of from about 140° to 240° C. This outer wall, when applied as a liquid can be dried (solvent removed) and cured by the application of heat and/or the application of a curing catalyst such as an amine. Other curing modalities such as photocuring can be employed as well, if appropriate. The liquid wall-forming compositions can contain plasticizers and builders and the like, if desired. The particular conditions used for forming the outer wall are conventional for processing polymers such as the urethanes which are preferred and are known to those of skill in the polymer arts.

The outer wall, whether supplied as a preformed structure, a cured liquid overcoat or a shrunk or adhered layer of stock goods is commonly from about 1 to 200 mils in thickness with thicknesses in the range of from about 2 to 50 mils being preferred and excellent results being attained with thicknesses of from about 3 to about 35 mils.

The core of the impact absorber is a foam. This foam is preferably an open-celled foam, that is a foam in which the various cells are in communication with each other and with the outer surface of the foam. Similar properties are achieved with a reticulated foam, that is a foam which has been treated to break down membranes which separated various cells. Foam rubber, foamed latex, vinyl foams and the like can be used. The preferred foam material for use in the core is poly(urethane) foam. Representative foams include the "Ensolite" foams sold by Uniroyal Plastics Co., Inc. and the flexible urethane foams sold by the E. R. Carpenter Company.

Typical densities for the foam core range from between about 0.5 to about 15 pounds per cubic foot. Preferred foam densities are from about 2 to 10 pounds per cubic foot.

It will be appreciated that because the foam core is adhered to the outer wall it is in effect a structural member. The adhered foam serves to prevent the ballooning of the device as previously described. This duty puts strain upon the foam of the core. If the foam separates under this strain it can result in a loss of integrity of the device. With this potential problem in mind, it is possible to reinforce the foam by including filaments or fibers or fabrics in it. Typical reinforcements can be inorganic materials such as fiberglass or carbon fiber; natural organic fibers such as silk, cotton, wool or the like or synthetic organic fibers such as urethane fibers, nylon filaments, nylon fabrics, aramid filaments and fabrics, and the like. This reinforcement can be laminated into the foam, incorporated into the foam or otherwise compounded into the foam as is known by those skilled in the art.

In the embodiment shown in FIGS. 1 and 2, the internal foam core is preshaped to fit tightly within the outer wall of the impact absorber.

This intimate fit may be accomplished in other ways as well. For one, the core can be foamed in place within the wall structure using injectable flexible foam forming materials known in the art. With the preferred urethane foams, a typical foaming mixture can include a polyether polyol, a diisocyanate such as toluene diisocyanate, water, and amine and organotin catalysts. This mixture generally contains polymeric fillers and flexibilizers (plasticizers) as well. The added water reacts with the isocyanates to produce an amine plus carbon dioxide gas which foams the liquid. Other foaming agents such as gases including carbon dioxide, nitrogen, air or the like as well as low boiling liquids, (commonly low-boiling fluorocarbons and the like) can also be added. By controlling the amount of foaming material added and the cure conditions, the core so formed can, if desired, prestress the outer wall as is preferred. The in situ cores can be closed-cell foams, open-celled foams or reticulated foams as desired.

In a hybrid form of construction, the foam core can be a composite of a preshaped foam body which does not completely fill the cavity created by the outer wall and an added foam-in-place layer between the wall and the preshaped body. This form of fabrication has the advantage that the desired intimate fit is achieved with a minimum of preshaping and fitting while at the same time the preshaped core provides a measure of dimensional stabilty and integrity to the composite during fabrication.

The third component of the impact absorbers of this invention is an adhesive for affixing the foam core to the wall. This adhesive is most conveniently an activated adhesive such as a light activated adhesive, UV activated adhesive or heat activated adhesive so as to permit the parts to be fitted together and then bonded. A typical heat-activated adhesive is the Royal Adhesive DC-11324 material sold by Uniroyal. This adhesive is a two part poly(urethane)/isocyanate adhesive which has the added advantage of being water-based. When applied to the foam and/or wall it dries to a non-tacky surface which permits easy assembly. This material heat-activates at 300°-325° F. to form a tough adherent bond. Other useful adhesives can include epoxy adhesives, contact cement type poly(urethane) adhesives such as the Uniroyal "Silaprenes", the 3M "Scothgrip" adhesives and the isoprene contact cements. In general, one can employ as adhesive any material which will bond the foam to the outer wall with a strength which will not be exceeded by the forces of impact applied to the impact absorber or by the forces applied by the pressure applied to the impact absorber.

In the fabrication methods in which a liquid solution of prepolymer is applied to the core to create the outer layer or in which the core is foamed in place, it is often the case that the required intimate bond between the core and the outer wall is formed directly without the need for added adhesive.

The outer wall portions of the impact absorber are joined together such as by the use of adhesive or by heat sealing or the like to give a fluid impermeable wall to which the inner core is bonded. After the fusing together of the wall components, the impact absorber can be trimmed and, if desired, further shaped to conform to the environment of use.

The core of the present impact absorbers contain a fluid. Gases and in particular air are very suitable fluids. Liquids and gells could be used as well, if desired.

Figure 3:
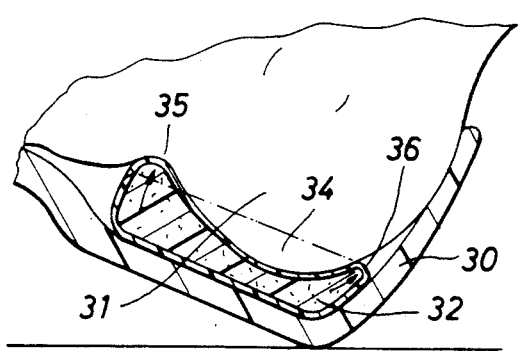
FIG. 3 is a partially schematic cross sectional view of an impact absorbing heel pad not embodying this invention. This heel pad has a wall defining a pressure-tight cavity but does not have a foam core adhered to and filling its inner surface. This figure illustrates the flaw in this design that an impact can be absorbed but at the same time ballooning occurs.
Figure 4:
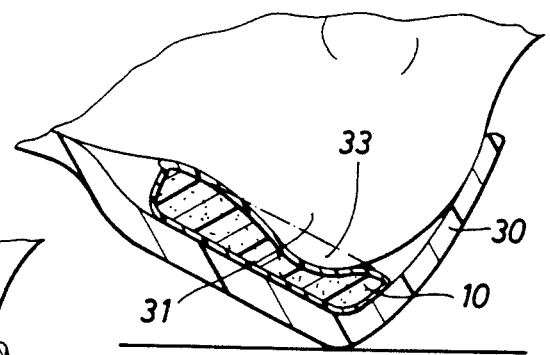
FIG. 4 is similar to FIG. 3 but illustrates that with the present invention ballooning is prevented.

Turning to FIGS. 3 and 4, the advantages of the impact absorber of this invention are graphically illustrated. In each of these figures a shoe 30 is shown together with foot 31 impacting downward into a heel pad shown as 32 (in FIG. 3—not according to the invention) and as 10 (in FIG. 4—in accord with this invention). In the case of heel pad 32, the downward pressure of the heel causes the center of the pad 34 to be severely depressed while permitting the edges 35 and 36 to balloon up. This can be uncomfortable and unstable. With pad 10 the center 33 depresses somewhat but there is minimal ballooning.

Figure 5:
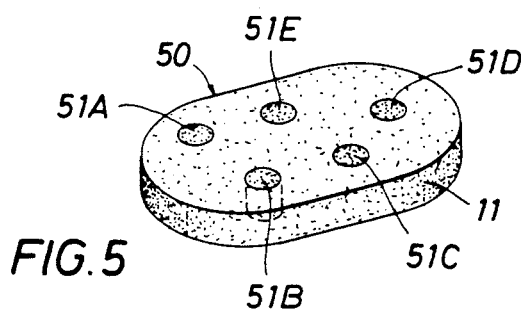
FIG. 5 is a perspective view of an alternative foam core for use in this invention. This core has a plurality of differing compression strength foams arranged parallel to the impact force.

Turning now to FIG. 5, a variation of the core 11 is shown. This core (core 50) is fabricated from a plurality of foams of differing properties, for example density. As shown, the core includes a series of plugs 51A, 51B, etc of firm density foam inserted into the body of core 11. This can result in a light weight core having the firmness of the plugs. This is merely a representative configuration and one could as well have one entire section of the core with one density foam and another section with another density. One could also vary the core based on other properties, such as the ability of a region of the foam to take a set or the like. The various core sections are adhered to the outer wall of the impact absorber as is shown in FIGS. 1 and 2. One could form a core of this type by placing preshaped pieces of one foam in the cavity and then foaming in place the other material, if desired.

The plastic wall of the impact absorber can have structural properties and contribute to the rigidity and shock absorbing properties of the device. FIGS. 6, 7 and 8 illustrate an embodiment 60 of the impact absorber which includes a depression or "column" 61 in its structure so as to provide additional wall surface and structure in that region of the absorber. In this embodiment as shown in FIG. 8, the valve 16 is illustrated being laminated into the composite as the top 12 is joined to the bottom 14.

FIG. 9 illustrates other variations which may be employed without departing from the spirit of this invention. FIG. 9 shows impact absorber 80. The foam core of absorber 80 is fabricated from several different foams including foam section 81, section 82, section 83 and section 84. These sections are all adhered to the wall 12/14. Valve 16 is again provided to permit the pressure of the core to be altered and controlled. The various core sections can be adhered to one another, if desired. If they are adhered to one another, it must be borne in mind that the glue layers or the like between the various sections can serve as barriers for the transport of fluid between the various sections. If such fluid communication is desired, gaps must be left in the glue layers or glues which are fluid-permeable must be used.

Absorber 80 includes several other features which can be incorporated into the present absorbers. An exterior pad 85 is provided. This can provide additional shock absorbancy. A top layer 86 is also present. This can be a cosmetic over layer or can be provided as a replaceable hygienic layer.

In the absorbers shown in FIGS. 1, 6 and 9, the means for adjusting the pressure (valve 16) has been in communication with the foam core itself and has relied upon the open-cell foam structure of the core to distribute the applied pressure throughout the core and thus provide a uniform level of support throughout the absorber. While this structure is very suitable, one can also employ closed-cell foams, if desired. FIGS. 10 and 11, and FIGS. 12 and 13 respectively illustrate two representative configurations for a closed-cell foam core. In the configuration shown in FIGS. 10 and 11, the core 87 contains an aperture 88 into which the pressure adjusting valve 16 can fit. This aperture 88 communicates with a network of channels 89 spaced throughout the core so as to transmit and distribute the pressure applied to aperture 88. In this embodiment, the network of channels is contained by and enclosed by the closed-cell foam core. This means that the core itself can contribute to the containment of the pressure applied to the channels. This offers the advantage that localized stress on the outer wall is avoided or minimized and possible failures due to rupture at localized stress points are minimized.

The configuration shown in FIGS. 12 and 13 is substantially the same as that shown in FIGS. 10 and 11 with the exception that aperture 97 communicates with a network of passages 98 which are not fully contained within the core. This configuration does not offer the localized stress relief of the configuration of FIGS. 10 and 11 but would be less expensive and simpler to produce.

Figure 14:
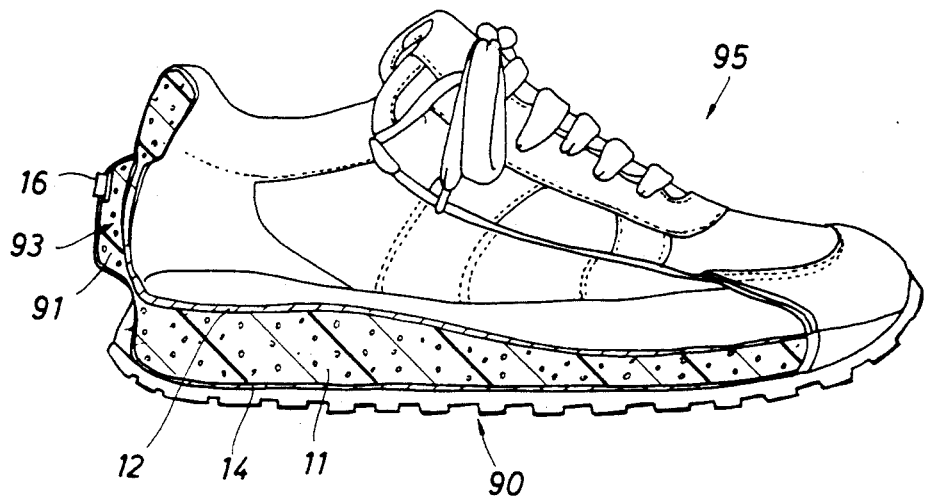
FIG. 14 is a cut away cross sectional view of a shoe containing a shock absorber of the present invention and additionally having a pump for pressurizing the core of the absorber.

Turning to FIG. 14 an additional embodiment of the impact absorber is shown as foot pad 90 housed within the sole portion of shoe 95. Foot pad 90 includes the foam core 11 and adherent outer wall 12/14 described herein. Pad 90 is equipped with a built in pump to alter the pressure within its core. This pump includes a one way check valve 16 which admits air into pump cavity 91. Pump cavity 91 is compressed and released to give a region of low pressure so that air can enter through valve 16. When the cavity 91 is depressed again, this forces the newly admitted air through passage 92 into the core 11, thus increasing its pressure. This process is repeated until the proper pressure is attained. Shoe 95 also includes a collar 93. This can be formed with the same structure as pad 90 with an internal core adhered to the walls. Such a collar would be very effective at absorbing the shock which would occur as the wearer's foot comes up in the shoe and impacts it or would be effective as a protection to the wearer's ankle and achilles tendon region.

Figure 15:
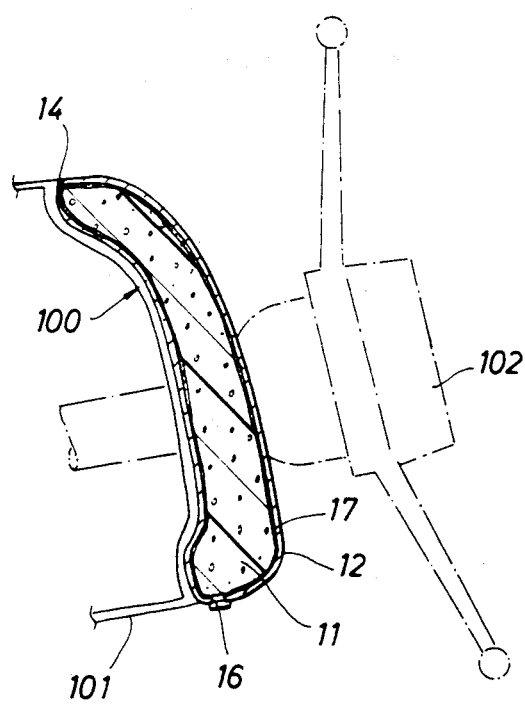
FIG. 15 is a cross sectional view of an automotive dash board incorporating an impact absorber of this invention.

FIG. 15 illustrates that the present invention finds application in many areas beyond athletic equipment. It illustrates an automotive dashboard structure 101 having an impact pad 100 on its face as well as phantom steering wheel 102. Impact pad 101 includes core 11, wall 12/14 and valve 16. Such a pad can provide efficient dashboard impact protection for the occupants of the automobile in the event of a crash.

Figure 16:
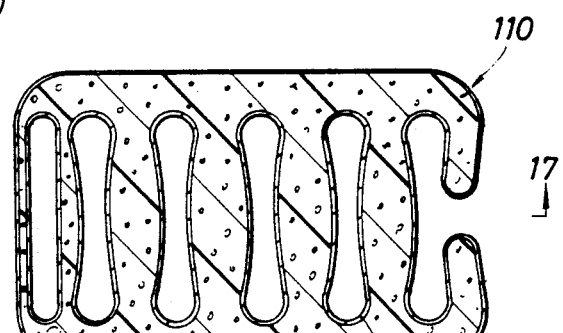
FIGS. 16 and 17 are two views of an additional representative application for the shock absorbers of this invention as a foot pad.
Figure 17:
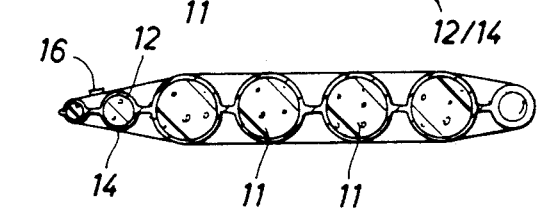

FIGS. 16 and 17 illustrate in two views a ventilated footpad 110 for use in shoes. Pad 110 has a complex shape which requires numerous compound curves. In its application as a shoe footpad, pad 110 will be subjected to a wide variation in impacts depending upon the weight of the runner using it and the runner's lightness of footstrike. It is of substantial advantage to adjust the pressure within the pad with valve 16 to accommodate these variations.

Figure 18:
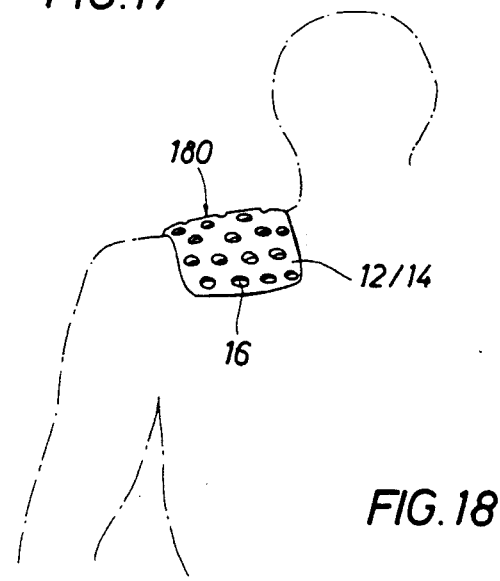
FIG. 18 is a perspective view of a shoulder pad under pad application for the shock absorbers of this invention.

FIG. 18 illustrates another embodiment of the present invention, an underpad 180 for use in conjunction with contact sports shoulder pads. Underpad 180 has a structure which includes numerous compound curves and a plurality of "Swiss-cheese" holes through its structure. The compound curve-forming ability and the plurality of holes permit the pad to conform to and bend over the wearer's shoulder with comfort and breathability. It is a special advantage that the present invention makes these complex curves possible and provides superior shock and impact absorption in such settings.

Figure 19:
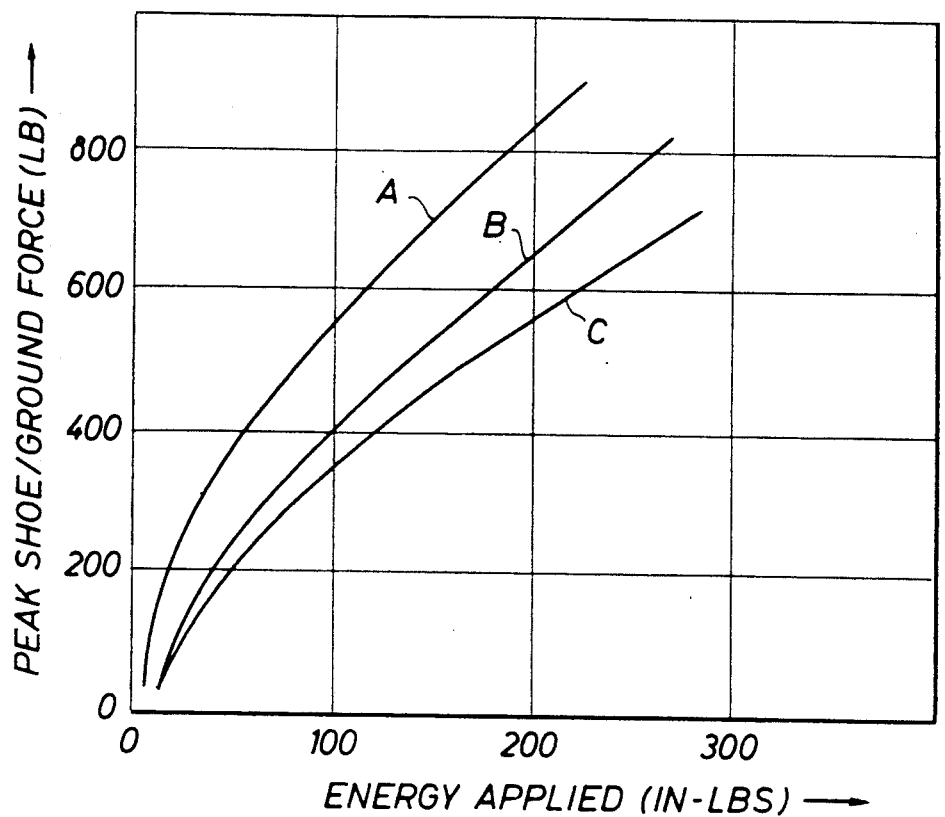
FIGS. 19 and 20 are graphs illustrating the effectiveness of the impact absorbers of this invention and their adaption to various body weights and to various impacts.
Figure 20:
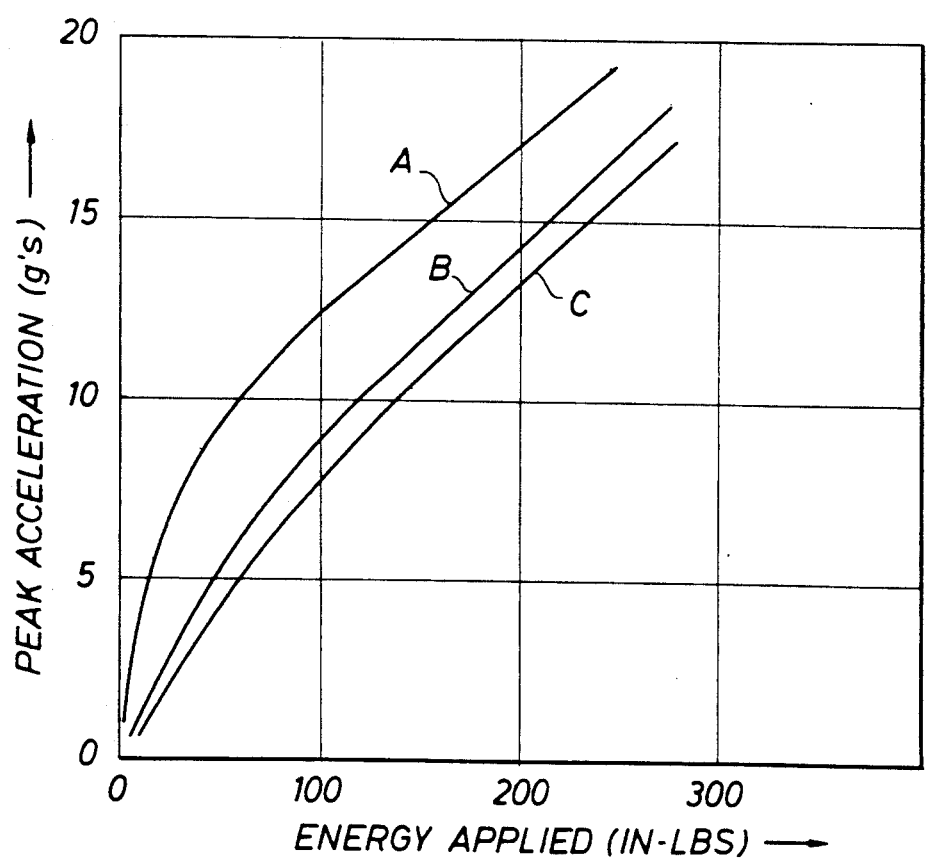

The effectiveness of the present invention can be demonstrated by comparative tests. A series of impact tests were run on a standard state-of-the-art basketball shoe. The same tests were then performed on the same model shoe which had been modified by replacing a portion of its sole structure (the heel pad region) with an impact absorber of this invention. The impact absorber was fabricated from 35 mil flexible poly(urethane). The core was about ½ inch thick open-cell poly(urethane) foam of 5 lbs per cubic foot density. The foam core slightly prestressed the outer wall by being somewhat oversized and was adhered to the walls using a heat activated waterbased urethane adhesive. Tests were run with the core sealed at atmospheric pressure and with the core pressurized to 5 and 10 psig. FIGS. 19 and 20 present the results of these tests. In each figure line A is the results observed with the prior art shoe. It can be seen that for a given application of energy to the shoe, i.e. a given impact, the shoe transmits a certain peak force and a certain acceleration, (in G's) to the wearer. Lines B show the results achieved when the atmospheric bladder is used. They show that the force and acceleration transmitted to the wearer is significantly reduced. Importantly, this reduction occurs over the entire range of applied energies. Thus the effectiveness of the present absorbers is substantially universal and will be observed with hard impacts such as may result with heavy athletes and also with lighter impacts such as may result with lighter weight athletes, etc.

Lines C show that even better shock absorbancy is achieved when a positive pressure is applied to the bladders. Similar results were obtained with the 5 and 10 pound pressures which suggest that in practical terms these pressures may be quite adequate. On the basis of these tests, it is believed that pressures in the range of 0 to about 20 psig are preferred.

The present invention has been described herein in detail with respect to a number of preferred embodiments and configurations. It will be appreciated, however, that modifications and changes to various aspects of these embodiments may be made while still coming with in the spirit and scope of this invention which is as defined by the following claims.

What is claimed is:

1. A method for producing a shock absorbing composite and dispersing impacting forces comprising forming a plastic enclosure having a shock absorbing configuration and defining an internal cavity therein, placing within said enclosure a foam core filling said cavity, retaining said core within said cavity such that the composite is generally impermeable to air but includes means for adding and removing pressurizing fluid from the internal cavity and such that the enclosure and the core are prestressed by one another, the core adhered on substantially all of its external surface with a heat activated adhesive to the internal surface of the enclosure, and pressurizing the core through said means for adding and removing pressurizing fluid from the internal cavity to a value between 0 and 20 psig effective to provide efficient impact absorption.

2. A method for producing a shock absorbing composite for absorbing and dispersing impacting forces comprising forming a flexible plastic enclosure having a shock absorbing configuration and defining an internal cavity therein, impermeable to air placing within said enclosure a preshaped foam core partially filling said cavity, forming in situ between said enclosure and said preshaped foam core a further foam core filling said cavity and joining substantially all of the core's external surface to the internal surface of the enclosure, retaining said cores within said cavity such that the composite is generally impermeable to air and capable of having its internal pressure changed and the enclosure and the core are prestressed by one another, and pressurizing the core to a value between 0 and 20 psig effective to provide efficient impact absorption.

3. A method for producing a shock absorbing composite for absorbing and dispersing impacting forces comprising forming a flexible foam core shaped and sized as required for said shock absorbing composite, applying to the outer surface of said core a flexible plastic layer thereby forming a flexible enclosure surrounding and adhered on all sides to said core, said flexible enclosure and said core being prestressed by one another, said enclosure being generally impermeable to air and capable of having its internal pressure changed, and pressurizing the core to a value between 0 and 20 psig effective to provide efficient impact absorption.

* * * * *